United States Patent
Johansson

(10) Patent No.: US 10,618,543 B2
(45) Date of Patent: Apr. 14, 2020

(54) STEERING COLUMN FOR A VEHICLE

(71) Applicant: Kongsberg Power Products Systems AB, Ljungsarp (SE)

(72) Inventor: Mattias Johansson, Hökerum (SE)

(73) Assignee: Kongsberg Power Products Systems AB, Ljungsarp (SE)

( * ) Notice: Subject to any disclaimer, the term of this patent is extended or adjusted under 35 U.S.C. 154(b) by 273 days.

(21) Appl. No.: 15/736,908

(22) PCT Filed: Jun. 26, 2015

(86) PCT No.: PCT/EP2015/064510
§ 371 (c)(1),
(2) Date: Dec. 15, 2017

(87) PCT Pub. No.: WO2016/206752
PCT Pub. Date: Dec. 29, 2016

(65) Prior Publication Data
US 2018/0362068 A1    Dec. 20, 2018

(51) Int. Cl.
*B62D 1/183* (2006.01)
*B62D 1/184* (2006.01)
*B62D 1/181* (2006.01)

(52) U.S. Cl.
CPC ............. *B62D 1/183* (2013.01); *B62D 1/181* (2013.01); *B62D 1/184* (2013.01)

(58) Field of Classification Search
CPC ......... B62D 1/181; B62D 1/183; B62D 1/184
See application file for complete search history.

(56) References Cited

U.S. PATENT DOCUMENTS 4,463,626 A * 8/1984 Kazaoka ................ B62D 1/183
                                                              180/78
4,530,254 A    7/1985 Toyoda et al.
(Continued)

OTHER PUBLICATIONS

International Search Report for Application No. PCT/EP2015/064510 dated Jun. 26, 2015, 3 pages.

*Primary Examiner* — Barry Gooden, Jr.
(74) *Attorney, Agent, or Firm* — Howard & Howard Attorneys PLLC

(57) ABSTRACT

The present invention is directed to a steering column for a vehicle comprising a lower column (2), an upper column (4) connected the lower column by a pivot connection, a locking mechanism including a tooth segment (6) fixed with respect to one of the lower and upper columns, and a tooth hook (8) pivotably mounted with respect to the other one of the lower and upper columns and biased to an engaged position meshing with the tooth segment (6) to lock the columns in an adjusted tilt position, and an actuator for pivoting the tooth hook (8) out of engagement with the tooth segment (6) characterized by a memory hook (20) connected to the same of the lower and upper columns as the tooth hook (8) and adapted to cooperate with the tooth hook so that the tooth hook gets engaged by the memory hook (20) when the tooth hook is moved to the disengaged position, a striker (30) fixed to the other of lower and upper column than the memory hook (20) and arranged such that it acts on the memory hook (20) when the upper column (4) reaches a tilted step-in/step-out position whereby the memory hook (20) is moved out of engagement with the tooth hook (8), and an adjustable memory striker (40) pivotably mounted on the other of lower and upper column than the memory hook (20) and lockable in a desired pivot position such that it acts on the memory hook (20) when the upper column reaches (4) an adjusted tilt position whereby the memory hook (20)

(Continued)

is moved out of engagement with the tooth hook (8) so that the tooth hook is biased back to the engaged position with the tooth segment (6).

9 Claims, 11 Drawing Sheets

(56) References Cited

U.S. PATENT DOCUMENTS

| | | | | |
|---|---|---|---|---|
| 4,750,379 | A * | 6/1988 | Nishikawa | B62D 1/181 280/775 |
| 4,819,498 | A * | 4/1989 | Nishikawa | B62D 1/181 280/775 |
| 4,876,910 | A * | 10/1989 | Nishikawa | B62D 1/181 74/493 |
| 4,938,093 | A | 7/1990 | Matsumoto et al. | |
| 5,144,855 | A * | 9/1992 | Yamaguchi | B62D 1/184 280/775 |
| 5,566,585 | A | 10/1996 | Snell et al. | |
| 8,327,734 | B2 * | 12/2012 | Cho | B60R 21/09 280/777 |
| 2004/0251672 | A1 * | 12/2004 | Lee | B62D 1/184 280/775 |
| 2012/0073399 | A1 * | 3/2012 | Olsson | B62D 1/184 74/493 |

\* cited by examiner

STEERING COLUMN FOR A VEHICLE

The subject application is the National Stage of International Patent Application No. PCT/EP2015/064510, filed on Jun. 26, 2015, the contents of which are incorporated herein by reference in their entirety.

The present invention is directed to a steering column for a vehicle comprising a lower column, an upper column connected the lower column by a pivot connection allowing to adjust a tilt angle of the upper column with respect to the lower column, a locking mechanism including a tooth segment fixed with respect to one of the lower and upper columns, and a tooth hook pivotably mounted with respect to the other one of the lower and upper columns and biased to a position meshing with the tooth segment to lock the upper and lower columns in an adjusted tilt position, and an actuator for pivoting the tooth hook out of engagement with the tooth segment.

A steering column is mounted in a vehicle cabin and receives a steering shaft which carries a steering wheel at its upper end. Simple steering column assemblies are rigid or inflexible, i.e. the steering wheel on top of the steering column is located at a fixed position in the vehicle cabin. In more complex assemblies the height and/or tilt angle of the steering wheel is adjustable. The present invention is directed to steering columns which allow to adjust the tilt angle of the steering wheel. There are steering column assemblies with tilt adjustment mechanisms utilizing electric or step motors to drive the steering column assembly components with respect to each other such that a desired tilt angle is achieved. On the other hand, there are mechanical tilt adjustment mechanisms which allow to manually adjust the tilt angle and which include a mechanical memory locking mechanism. In such mechanical memory locking mechanisms the adjusted tilt angle of the steering wheel can be set and the steering wheel can be unlocked, can be brought to a tilted position and be returned to the originally set adjusted position and be locked there again. There are for example steering columns which allow to tilt the steering wheel to a step-in/step-out position in which the steering wheel is turned further away from the driver. This step-in/step-out position of the steering wheel provides improved comfort for the driver when entering or exiting the car. The present invention is directed to a steering column including such mechanical memory locking mechanism and allowing pivoting of the upper column to a step-in/step-out position.

U.S. Pat. No. 4,938,093 A disclose a steering column according to the preamble of claim 1. The steering column comprises a lower column adapted to be mounted to a vehicle cabin structure. An upper column is connected to the lower column by a pivot connection which allows to adjust a tilt angle of the upper column with respect to the lower column. A memory locking mechanism includes a tooth segment fixed with respect to the upper column, and a tooth hook pivotably mounted with respect to the lower column. The tooth hook is biased by a bias force to be pivoted to an engaged position in which the teeth of the tooth hook are meshing with the teeth of the tooth segment. There is an actuator by which a force can be exerted on the tooth hook such that it is pivoted away from the tooth segment to a position out of engagement with the tooth segment such that the upper column may be pivoted, for example for exiting or entering the car. Thereafter, the steering wheel can be returned to its originally adjusted tilt position in which it is locked again by the memory locking mechanism. This known steering column can only be locked in the memorized adjusted tilt position, but not in addition in a step-in/step-out position.

It is an object of the present invention to arrange a steering column according to the preamble of claim 1 in such a manner that the upper column can be locked in a memorized tilt position and in a step-in/step-out position.

This object is achieved by the steering column comprising the features of claim 1. Preferred embodiments of the invention are set out in the dependent claims.

According to the present invention the steering column further comprise a memory hook adapted to cooperate with the tooth hook so that the tooth hook gets engaged by the memory hook when the tooth hook is moved to the disengaged position to thereby keep the tooth hook in the disengaged positions. Thus, the function of the memory hook is to keep the tooth hook out of engagement with the tooth segment once the actuator has been actuated to unlock the memory locking mechanism. The memory hook maintains this state of the tooth hook being out of engagement with the tooth segment, until a further component acts on the memory hook to bring it out of engagement with the tooth hook, whereafter the tooth hook is returned to the engaged position meshing with the tooth segment by the bias force acting on the tooth hook.

The steering column further comprises a striker fixed to the other of lower and upper column than the memory hook and arranged such that it acts on the memory hook when the upper column approaches a tilted step-in/step-out position, whereby the memory hook is moved out of engagement with the tooth hook so that the tooth hook is biased back to the position in engagement with the tooth segment. In addition, there is an adjustable memory striker pivotably mounted on the other of lower and upper column than the memory hook and lockable in a desired position such that it acts on the memory hook when the upper column reaches an adjusted tilt position whereby the memory hook is moved out of engagement with the tooth hook so that the tooth hook is biased back to the position in engagement with the tooth segment. Therefore, the adjustable memory striker ensures that the memory locking mechanism returns to its locked state once the upper column reaches the memorized or adjusted tilt position.

In a preferred embodiment a tilt stop is provided on one of the lower and upper columns, and a cooperating tilt stop surface is provided on the other of the lower and upper columns which are arranged to cooperate to prevent further tilting movement of the upper column beyond the step-in/step-out position when reaching the step-in/step-out position coming from the adjusted tilt position. Likewise a memory tilt stop is connected to the memory striker which is pivotably mounted on one of the lower and upper columns, and a cooperating memory stop surface is provided on the other of the lower and upper columns, which memory tilt stop and memory tilt stop surface are arranged to block further tilt movement of the upper column when the upper column has reached the adjusted tilt position coming from the step-in/step-out position.

In a preferred embodiment the tooth hook is pivotably connected to the lower column, and the striker and the tooth segment are fixed to the upper column and the memory striker is pivotably mounted to the upper column.

In a preferred embodiment a tilt stop is provided on one of the upper and lower columns which come into abutment with the other one of the lower and upper columns when the upper column reaches the step-in/step-out position and thereby prevents tilting movement of the upper column beyond to the step-in/step-out position. Furthermore, a memory tilt stop is connected to the memory striker which mechanically blocks further tilt movement of the upper column when the upper column has reached the adjusted tilt position as adjusted by the position of the memory striker.

With the present invention a steering column with a tilt adjustment mechanism is provided which utilizes very few mechanically acting components allowing to lock the upper column in a step-in/step-out position as well as in a memorized adjusted tilt position.

In a preferred embodiment the memory hook is biased to move to a rest position and arranged to cooperate with the tooth hook such that the memory hook is free to move towards its rest position when the tooth hook reaches its disengaged position, wherein the movement of the memory hook to its rest position causes an interlocking engagement that keeps the tooth hook in the disengaged position.

In a preferred embodiment the memory hook is an elongated element with an upright end which is elastically flexible to be bent in a lateral direction, wherein the elasticity of the memory hook provides for the bias to the upright rest position of the memory hook. This bending of the memory hook may for example be released when an opening in the memory hook reaches a tip portion of the tooth hook such the tip portion is received in the open. This on the one hand permits that the memory hook flexes back to its upright rest position, and on the other hand provides for the engagement of the memory hook and the tooth hook, which may be released again by bending the memory hook back.

In a preferred embodiment an adjustment lever is provided which is moveable from a first position in which it locks the memory striker with respect to the upper column to a second position in which the memory striker is pivotable with respect to the upper column in order to allow adjustment to a new adjusted tilt position of the upper column. In the second position of the adjustment lever the memory striker is free to follow the movement of the upper column in abutment on the memory hook until the driver has set the upper column to the new desired tilt position, whereafter the adjustment lever is turned back to its first position to lock the memory striker in the new memorized tilt position for the upper column.

In a preferred embodiment the memory hook is extending from the lower column towards the upper column and is elastically flexible so that its free and can be flexed out of the central rest position in two opposite directions. In this case it is preferred that the memory hook comprises an elongated slot generally extending in the longitudinal direction of the upper and lower columns, wherein the elongated slot is arranged to receive a tip portion of the tooth hook which is opposite to the pivotal connection of the tooth hook. The elongated slot is arranged and dimensioned such that the tip portion of the memory hook can move along the elongated slot when the tooth hook is pivoted out of engagement with the tooth segment. Furthermore, the tooth hook comprises a projection which is pointing towards the upper end of the elongated slot and which is arranged to be in the region of the elongated slot when the memory hook is its rest position and the tooth hook is in the disengaged position pivoted away from the tooth segment. In t his manner the projection is lying within the elongated slot and abuts against the upper end of the elongated slot to keep the tooth hook in the disengaged position pivoted away from the tooth segment. When the tooth hook is in the engaged position the memory hook is flexed to either side of the projection so that the tooth hook could reach the engaged position on the tooth segment without interference of the projection of the tooth hook with the memory hook. On the other hand, when the tooth hook is again moved from engaged position to the disengaged position by pressing the actuator the memory hook then flexes back to its central rest position when the upper end of the slot in the memory hook has passed the upper end of the projection on the tooth hook.

In a preferred embodiment the striker and the memory striker are arranged to act on the memory hook by flexing it out of its rest position in such a manner that the upper end of the slot is moved out of the region of the projection on the tooth hook so that the return force is able to return the tooth hook to the engaged position on the tooth segment without interference of the tooth hook projection with the upper end of the slot of the memory hook.

The invention will now be described with reference to a preferred embodiment shown in the drawings in which.

Figure 1:
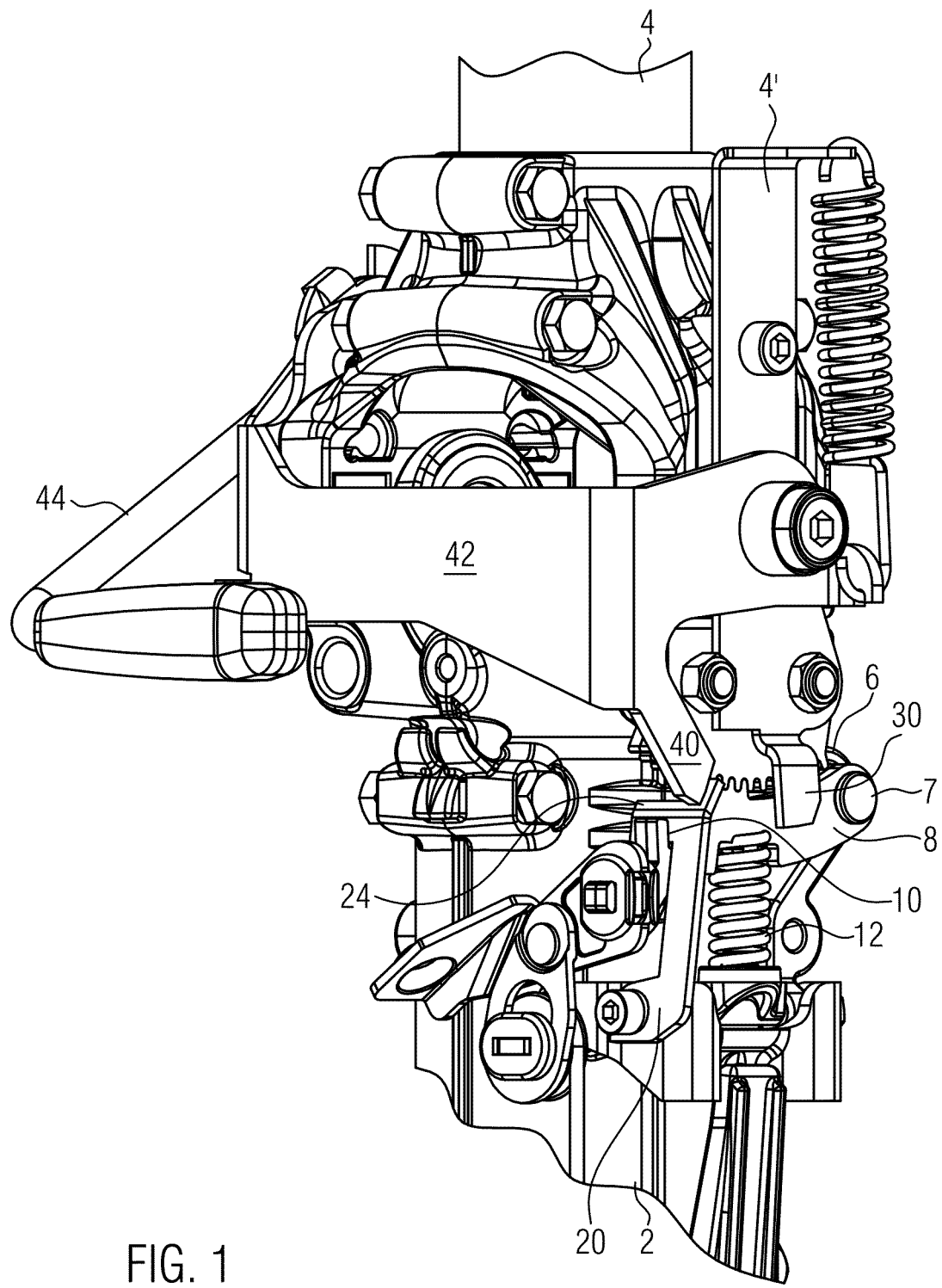
FIG. 1 shows a perspective view of a central part of the steering column assembly including a pivotal connection between a lower and upper column.

With reference to FIGS. 1 to 4 an overview of the steering column and its locking mechanism will now be given. In FIG. 1 a central portion of the steering column is shown, wherein only an upper end portion of the lower column 2, and a lower end portion of the upper column 4 are shown. The lower column 2 is fixed with respect to the vehicle cabin, the upper column is supported by the lower column 2 and connected to it by a pivot connection. In the Figures reference numeral 4' designates a component that is fixed with respect to the upper column component.

The pivot connection is provided with a releasable locking mechanism which allows to lock the upper column at a desired tilt angle with respect to the lower column.

The locking mechanism comprises a tooth hook 8 which is fixed to a shaft 7 which is received in a pivotal mounting on the lower column. A spring 12 (see FIG. 1) is supported by the lower column and acts on the tooth hook 8 to urge it to be pivoted upwardly to an engaged position. The tooth hook 8 is provided with a series of teeth disposed on an upper edge of the tooth hook 8.

Figure 2:
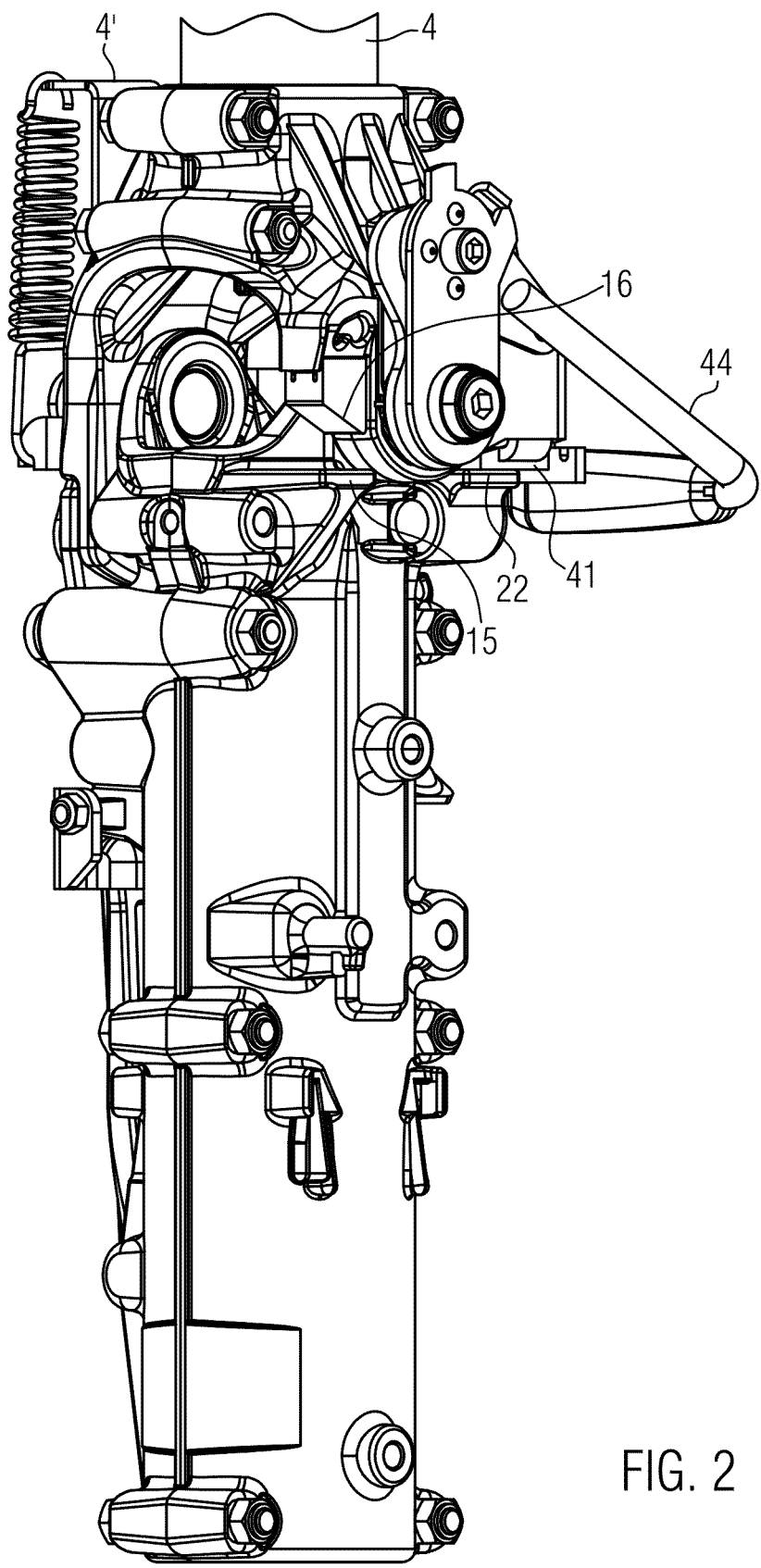
FIG. 2 shows a perspective view of the steering column assembly of FIG. 1 showing the opposite side compared to FIG. 1.
Figure 3:
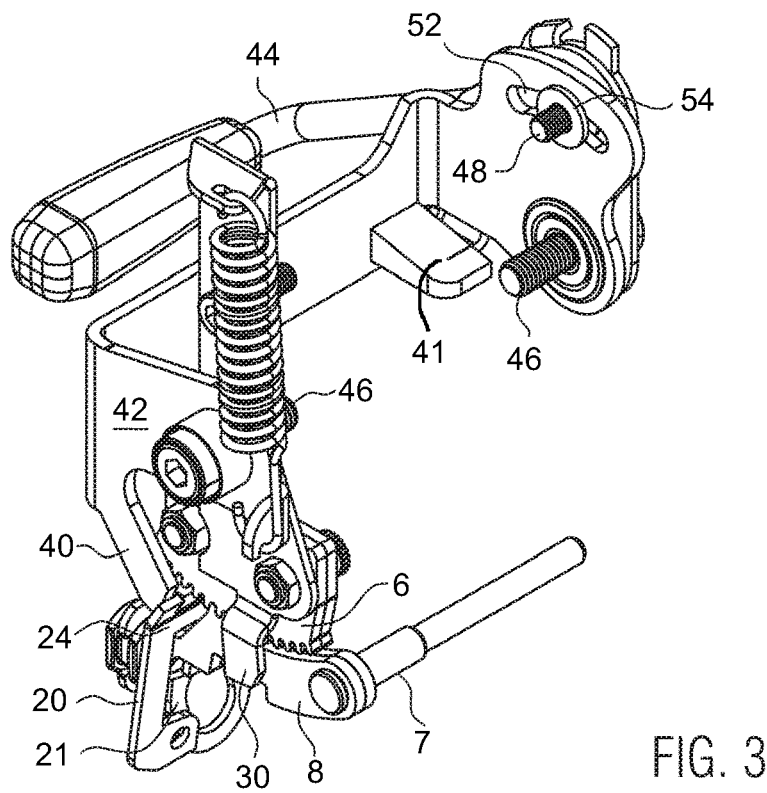
FIGS. 3 and 4 show perspective views of components of a locking mechanism with other components of the steering column assembly omitted for clarity of presentation.

Opposite to the tooth hook 8 a tooth segment 6 is fixed with respect to the upper column. The tooth segment 6 carries a series of complementary teeth on its lower edge. In FIGS. 1 to 3 the tooth hook is in the engaged position in which the teeth of the tooth hook 8 are meshing with the teeth of the tooth segment 6. Since the tooth segment 6 is fixed on the upper column and the tooth hook 8 only allows pivotal movements about its shaft 7 with respect to the lower column, the pivot connection between the upper and lower columns 4, 2 is locked when the tooth hook 8 is engaged with the tooth segment 6. For unlocking the locking mechanism tooth hook 8 is pivoted about shaft 7 such that the front end portion 9 of the tooth hook 8 opposite to the shaft 7 moves downwardly to move the teeth of the tooth hook 8 out of engagement with the teeth of tooth segment 6. For this purpose an actuator is provided, for example a pedal (not shown) which is mounted next to a lower end region of the lower column. This actuator is connected by a cable (not shown) to the front end portion 9 of tooth hook 8. This actuator could also be provided by a lever acting on the end portion 9 of tooth hook 8.

In FIGS. 5 to 12 a terminal end portion 7 of a cable connected to the pedal is shown. In order to unlock the locking mechanism the driver presses down the pedal, whereupon the cable is pulled down which causes tooth hook 8 to pivot downwardly against the bias force of spring 12 to bring tooth hook 8 out of engagement with tooth segment 6.

The locking mechanism further comprises a memory hook 20 which is fixed with respect to the lower column. Memory hook 20 has a cut-out or recess portion 21 below an upper hook member 24 (see FIGS. 3 and 4) extending horizontally. The memory hook 20 is elastic such that an upper free end portion of the memory hook 20 can be bent or flexed out of an upright rest position when force is acting on the memory hook 20. Alternatively the memory hook could have a pivot connection to the lower column allowing it to be pivoted out of the upright rest position to either side, and springs could be provided to bias the memory hook to the rest position.

A tip portion of tooth hook 8 is extending through the recess portion 21 of memory hook 20. This tip portion of memory hook 8 is provided with a finger or projection 10 (see FIG. 1 and FIG. 5) projecting upwardly. The projection 10 of the tooth hook 8 is arranged to cooperate with memory hook 20 in the following manner. When tooth hook 8 is pivoted downwardly out of engagement with tooth segment 6, and when memory hook 20 is free to return to its upright rest position, hook element 24 of memory hook 20 is disposed vertically above the upper end wall of projection 10 of the tooth hook 8. In this manner memory hook 20 is capable of keeping tooth hook 8 in the disengaged position by engaging the upper end wall of projection 10 with hook element 24 of memory hook 20. This situation is shown in FIG. 6 which shows tooth hook 8 kept in the disengaged position.

Figure 4:
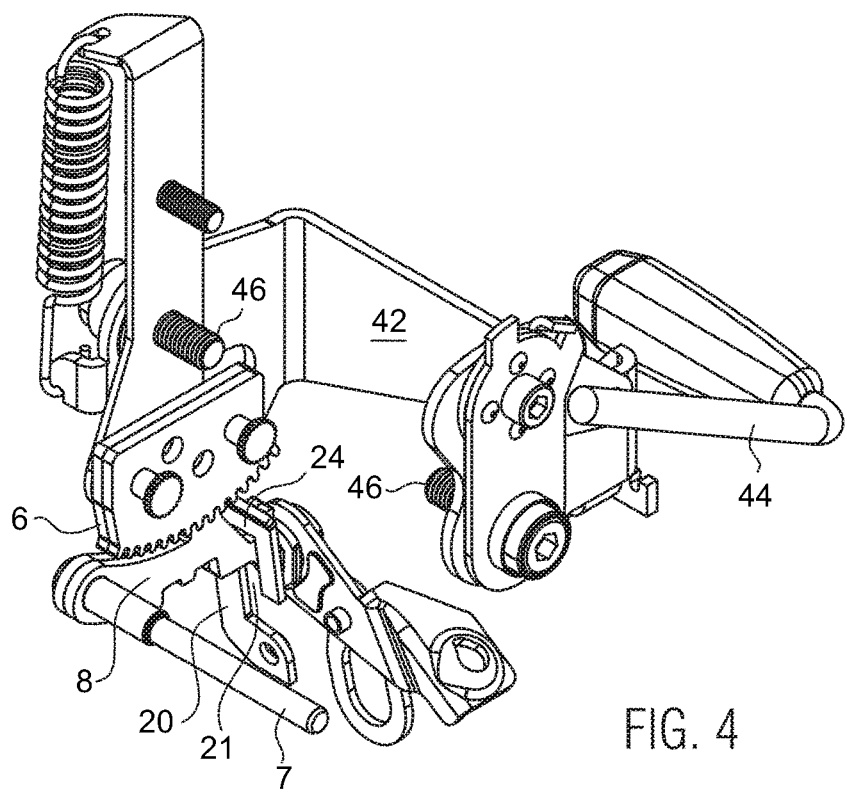

In order to bring memory hook 20 out of engagement with tooth hook 8 in the disengaged position of the tooth hook 8, a force has to be exerted on memory hook 20 such that it is bent in lateral direction so that hook element 24 (see FIGS. 3 and 4) is moved away from projection 10. Then tooth hook 8 is pivoted upwardly again driven by spring 12. The result of this movement is shown in FIG. 4.

The force to bend memory hook 20 has been exerted by a striker 40 projecting from a striker bracket 42. Striker bracket 42 is mounted by pivot pins 46 to the upper column so that it can be pivoted about an axis defined by pivot pins 46 which axis is perpendicular to the longitudinal axis of the upper column. Also connected to the upper column is an adjustment lever 44. This adjustment lever 44 carries a pin 48 that is received in an elongated slot 52 in striker bracket 42. The pin 48 holds a disk 54 which abuts against inner surface portions of striker bracket 42 adjacent the elongated slot 52. If the adjustment lever 44 is in a closed position the disk 54 is tightly pulled against the inner surface of striker bracket 42 such that striker bracket 42 is locked with respect to the upper column. If adjustment lever 44 is pivoted upwardly to an open position disk 54 is released such that it can slide along the inner surface of the striker bracket 42. In this situation striker bracket 42 may pivot about pivot pins 46 with respect to the upper column. This pivoting of the striker bracket 42 occurs when the adjustment lever 44 has been pivoted to the open position and the upper column is tilted to a new desired tilt position with respect to the lower column as will be explained in more detail below. Once the new desired tilt position has been reached the adjustment lever 44 is pivoted to the closed position, whereby the striker bracket 42 is locked on the upper column and cannot pivot about pivot pins 46 any longer.

Besides memory striker 40 there is a further striker, namely striker 30 which is fixed with respect to the upper column. This striker 30 is arranged such that it is moved against the upper end of memory hook 20 when a step-in/step-out position of the upper column is reached. In this case striker 30 (see FIG. 7) comes into abutment with the upper end of memory hook 20 and eventually bends memory hook 20 away from projection 10 of tooth hook 8 to allow tooth hook 8 to be urged into engagement with tooth segment 6. This situation is shown in FIG. 8 which shows the upper column locked in the step-in/step-out position.

Furthermore, tilt stops and cooperating tilt stop surfaces are provided that limit pivotal movement of the upper column to the range between the step-in/step-out position and the memorized adjusted tilt position. In particular, there is a tilt stop 16 with an inclined lower surface on the upper column (see FIG. 2) and a cooperating tilt stop surface 15 on the lower column which come into abutment when the upper column reaches the step-in/step-out position to thereby block further tiling movement of the upper column beyond the step-in/step-out position. In addition, the striker bracket 42 is provided with a memory tilt stop 41 (see FIGS. 2 and 3). This memory tilt stop 41 is in fixed relationship with the striker bracket 42 such that it moves with the striker bracket 42 to adjust to a new adjusted tilt position. The memory tilt stop 41 is arranged to cooperate with a memory tilt stop surface 22 fixed to the other of the lower and upper columns, in the embodiment shown fixed to the lower column. The memory tilt stop 41 and the cooperating memory tilt stop surface 22 are arranged such that further tilting movement of the upper column is stopped when the upper column reaches the memorized adjusted tilt position coming from the step-in/step-out position.

In the following the operation of the steering column assembly and its locking mechanism will be described first in connection with FIGS. 5 to 9. These FIGS. 5 to 9 show a sequence of movement states when the upper column is moved from a state in which it is locked in a previously adjusted tilt position to a state in which it is locked in the step-in/step-out position.

Figure 5:
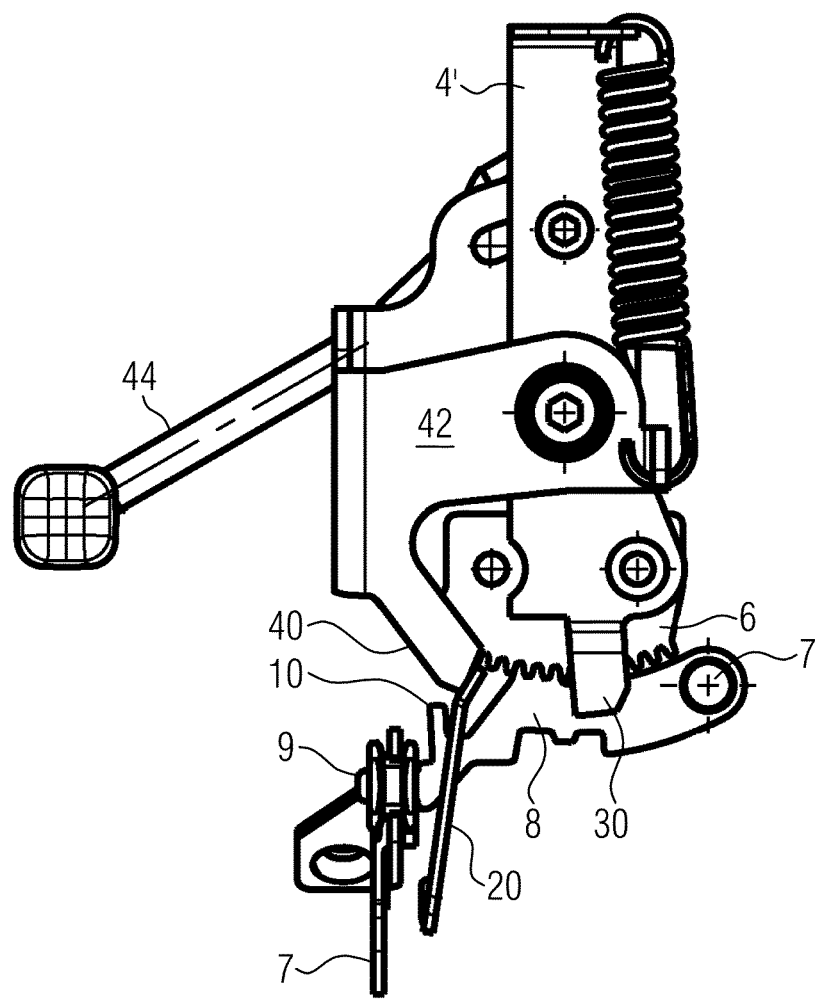
FIGS. 5 to 12 show side views of the locking mechanism of the steering column during tilting operations and adjustment operations of the tilt angle of the upper column with respect to the lower column, again with other components of the steering column assembly omitted for clarity of presentation.
Figure 6:
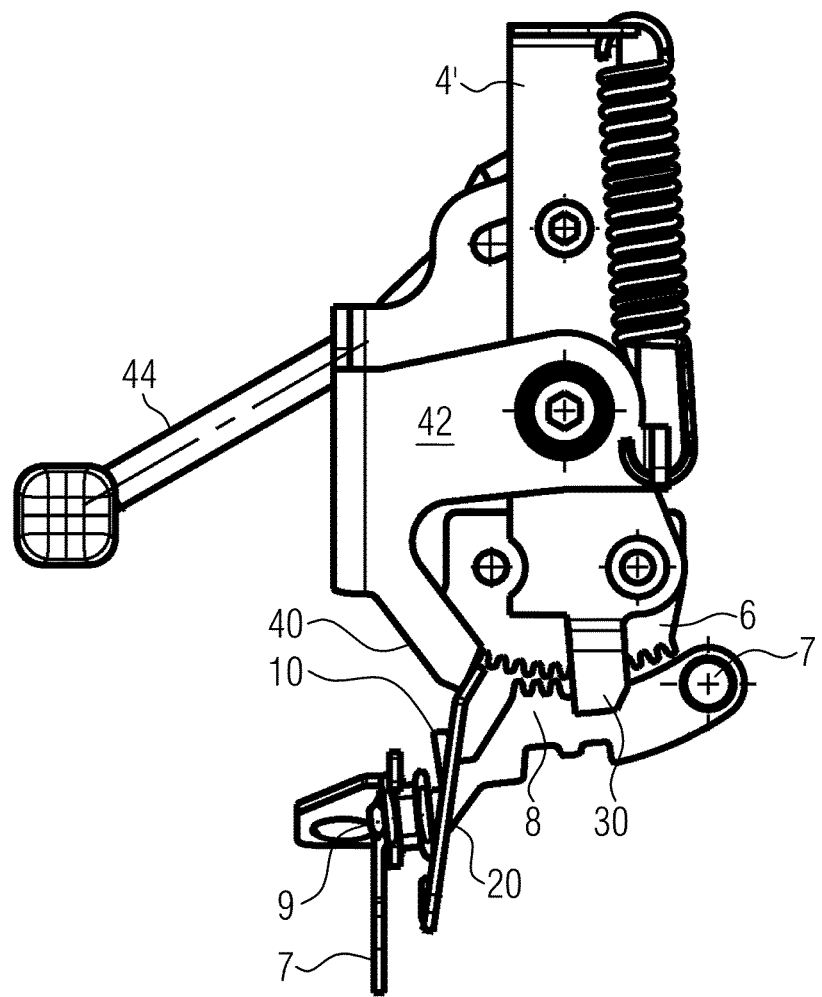

In FIG. 5 tooth hook 8 is engaged with tooth segment 6 such that the upper column is locked in the previously adjusted tilt position. In this previously adjusted tilt position striker 40 is pressing against an upper end portion and has bent memory hook 20 to the right hand side in the view of FIG. 5. Due to this bending memory hook 20 has been moved out of engagement with the upper end wall of the projection 10 of tooth hook 8 which caused tooth hook 8 to return to the engaged position.

Next the driver wants to leave the car and presses a pedal mounted next to the lower region of the lower column. A cable (not shown) connected to the pedal is pulled down when the pedal is pressed, whereby a cable terminal portion 7 fixed to the front end portion 9 of tooth hook 8 is pulled down. This movement phase is shown in FIG. 6.

Figure 7:
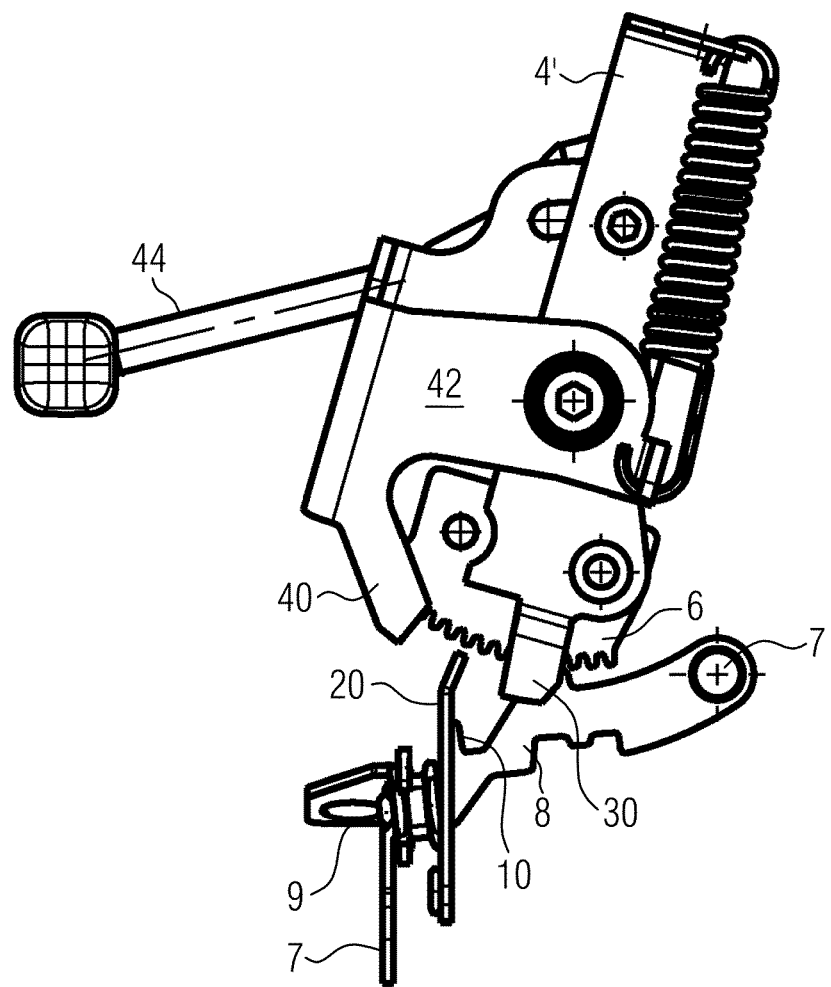
Figure 8:
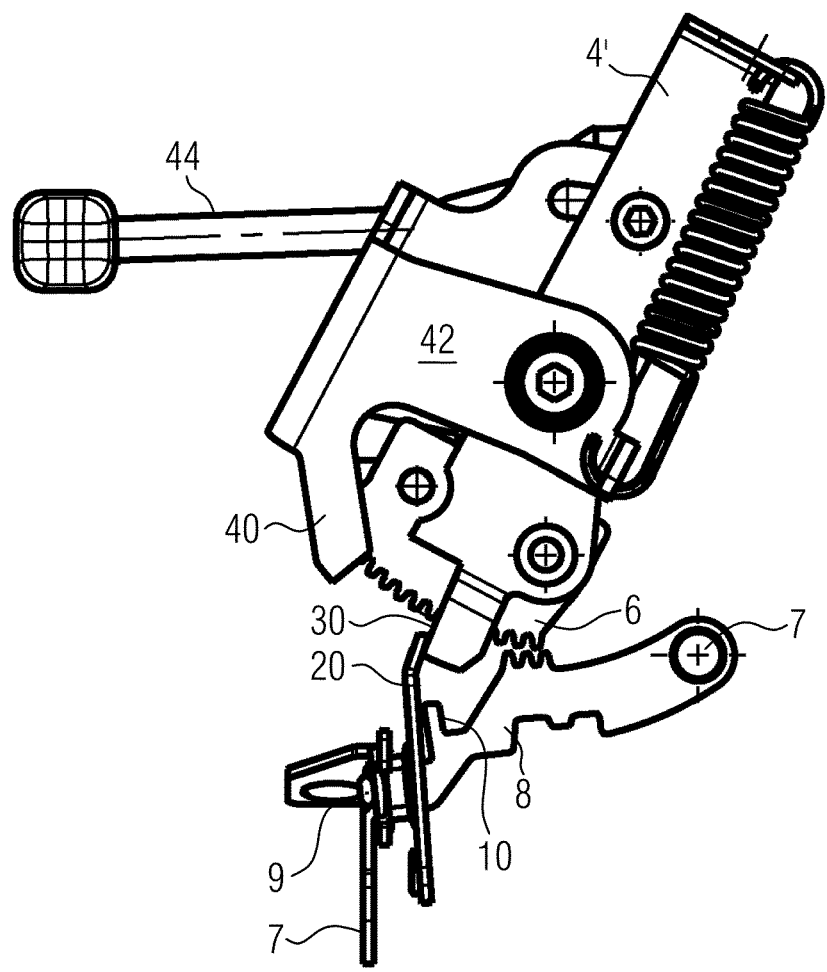

In FIG. 7 the upper column has been tilted towards the step-in/step out position. In the course of this movement striker 40 has been moved away from the upper end of memory hook 20. In addition the upper end wall of projection 10 of tooth hook 8 has been moved to a level below hook element 24 of memory hook 20. Since memory hook 20 is elastic it returns to its upright rest position in which the hook element 24 of memory hook 20 is moved over the upper end wall of the projection 10 of tooth hook 8 so that tooth hook 8 is kept in the disengaged position by memory hook 20. This situation is shown in FIG. 7. The driver can after this initial tilt motion release the pedal or lever that was used to pivot the tooth hook down, and continue to move the column to step in/step out position or back to adjusted tilt position for driving, which is possible because the memory hook 20 acts as a latch holding the tooth hook 8 in the disengaged position.

Figure 9:
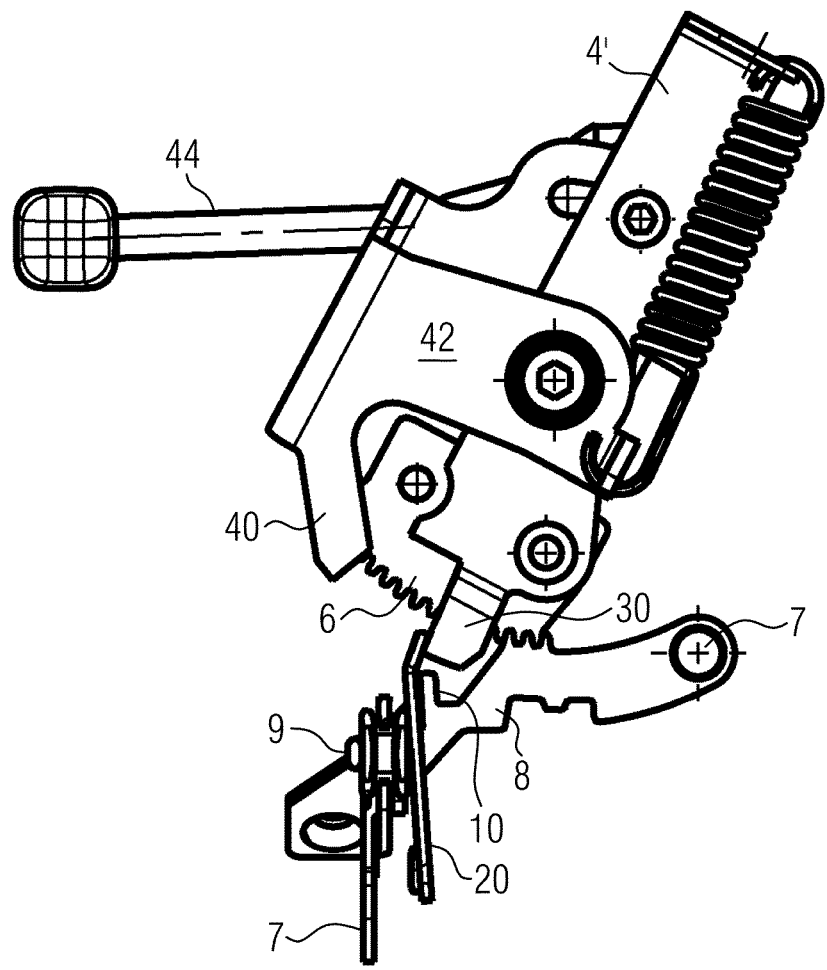

In FIG. 8 the upper column is further tilted and is approaching the step-in/step-out position. Immediately before the upper column reaches the step-in/step-out position the striker 30 comes into abutment against the upper end of memory hook 20 and starts to bend it to the left hand side. Once the projection 10 of tooth hook 8 is released from the hook element 24 of memory hook 20, tooth hook 8 is pivoted upwardly by the bias force of spring 12 and is moved to the engaged position meshing with tooth segment 6. This state is shown in FIG. 9 in which the tooth hook 8 is shown in the engaged position locking the upper column in the step-in/step-out position. In this state memory 20 is slightly bent to the left hand side. At the same time tilt stop 16 came into abutment on tilt stop surface (FIG. 2) to block further pivotal movement of the upper column 4 beyond the step-in/step-out position.

If the driver now returns to the car and sits down in the driver seat, the upper column has to be moved from the step-in/step-out position to the previously adjusted tilted position again. The driver presses down the pedal which disengages the tooth hook 8 from tooth segment 6 and pivots the upper column back, as shown in FIGS. 7 and 6, wherein the upper column approaches the previously adjusted tilt position in FIG. 5. When the upper column 4 reaches the previously adjusted tilt position tilt memory stop 41 comes into abutment with memory tilt stop surface 22 to block further tilting movement of the upper column beyond the previously adjusted tilt position. Simultaneously memory striker 40 comes into abutment against memory hook 20 and starts to bend it to the right hand side to bring it out of engagement with projection 10 of tooth hook 8. When the upper column reaches previously adjusted tilt position the memory tilt stop 41 comes into abutment on memory tilt stop surface 22 to stop pivotal movement of the upper column. At the same time, when memory hook 20 comes out of engagement with the projection 10 tooth hook 8 returns driven by the bias force into the engaged position meshing with tooth segment 6 so that the upper column is locked again in the previously adjusted tilt position, as shown in FIG. 5.

In the following it will be described how the steering column assembly is adjusted to a new desired tilt position of the upper column. This process will be described in connection with FIGS. 10 to 12.

Figure 10:
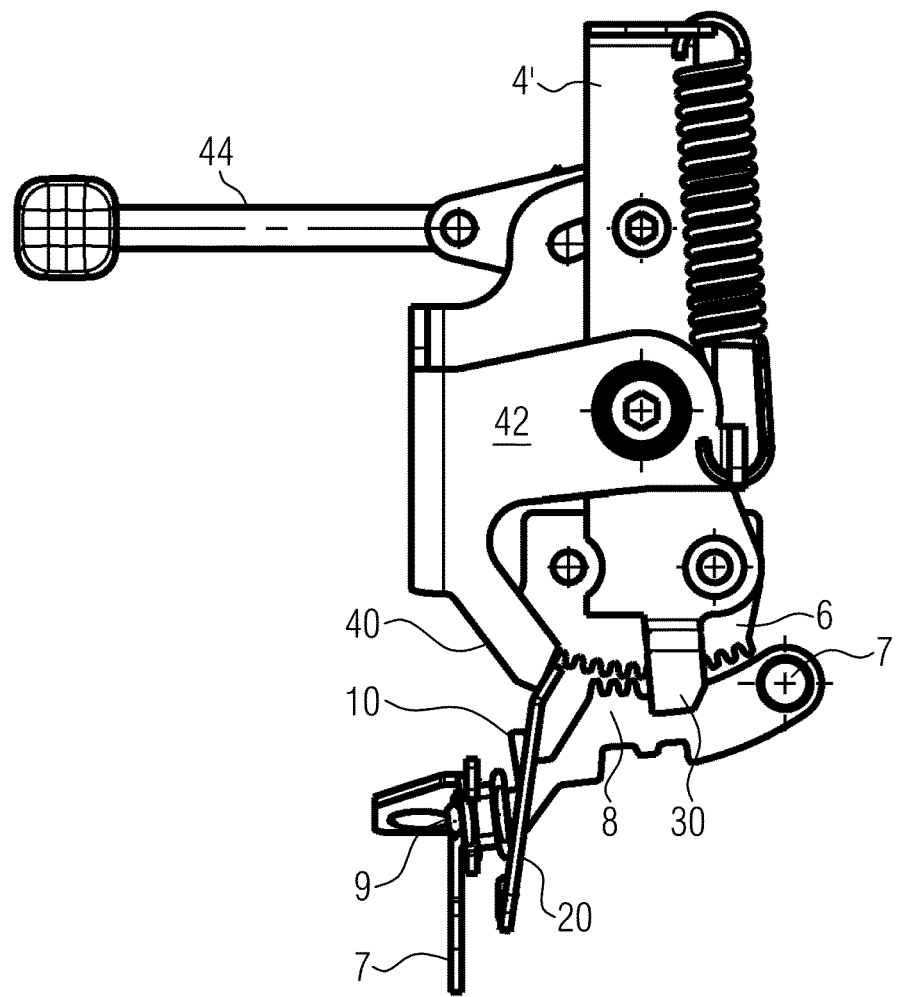

In FIG. 10 tooth hook 8 has already been pivoted to the disengaged position by pressing the pedal. Furthermore, adjustment lever 44 has been turned upward to unlock memory bracket 42 from the upper column so that memory bracket 42 may pivot about pivot pins 46 (see FIGS. 10 and 11). This adjustment lever function can be replaced by other means, such as a simple screw or other clamping arrangements.

Figure 11:
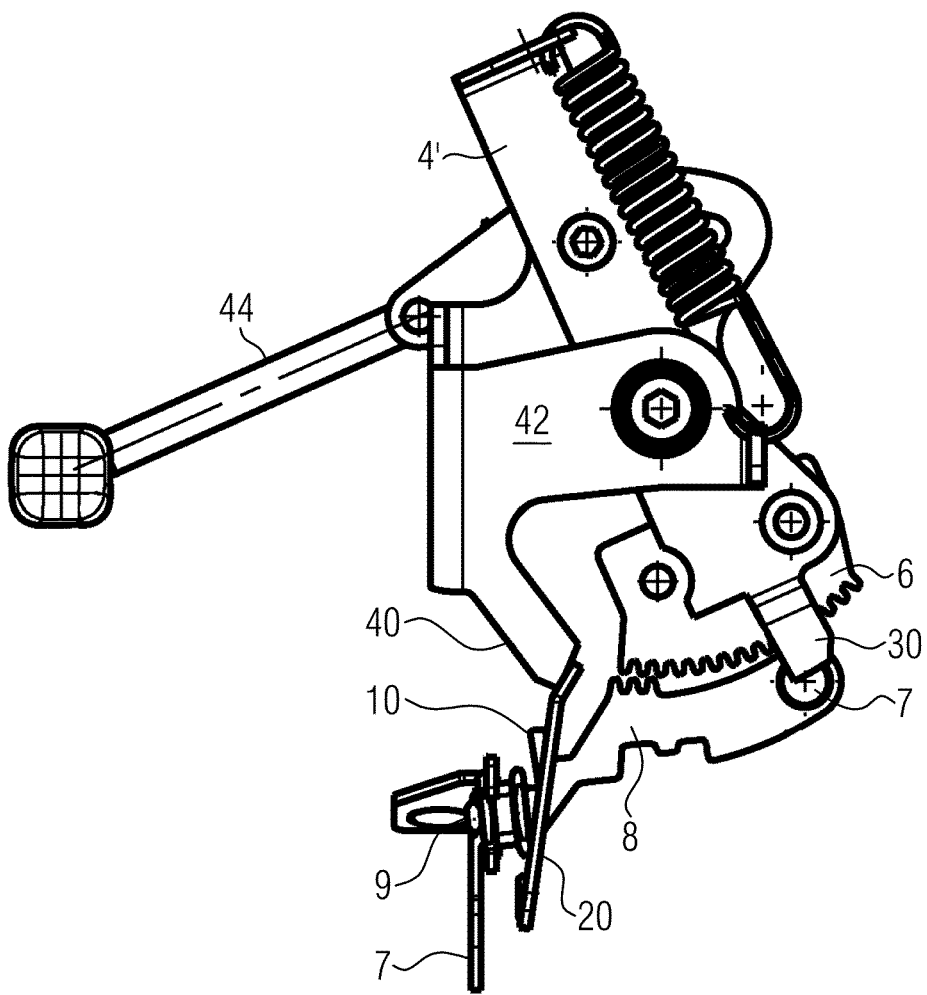
Figure 12:
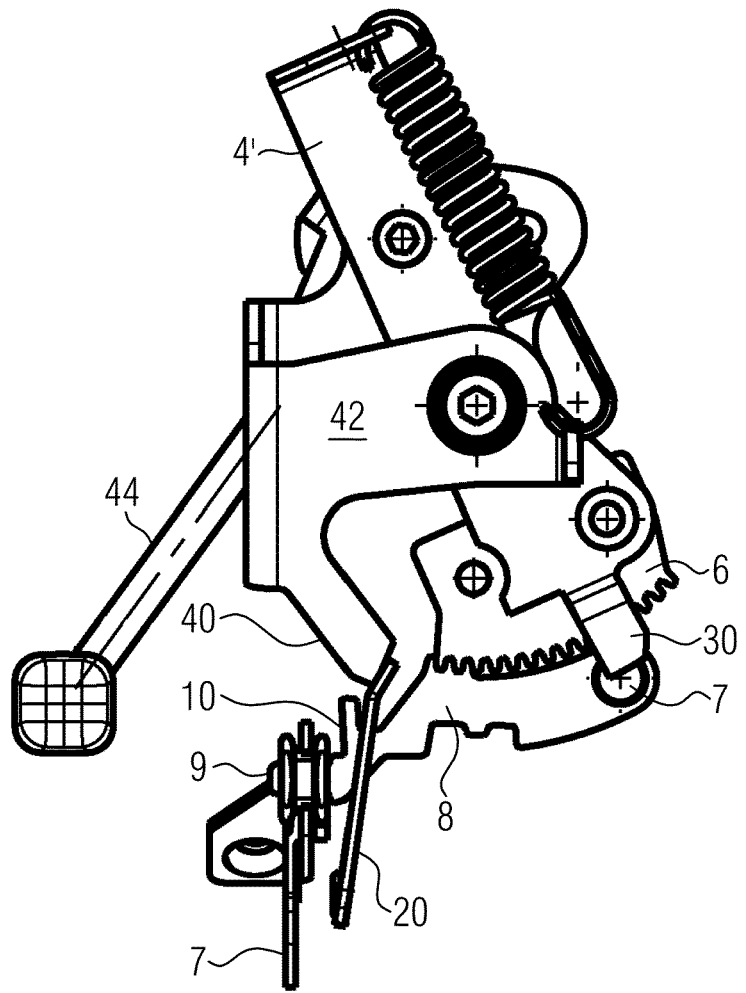

In FIG. 11 the upper column has been tilted to a new desired tilt position. During this movement memory striker 40 of memory bracket 42 was in engagement with an upper end portion of memory hook 20. For this reason memory bracket 42 did not follow the tilt movement of the upper column and therefore has been pivoted to a new pivotal position with respect to the upper column 4. After the new desired tilt position has been reached in FIG. 11 the adjustment lever 44 is turned down again in order to lock memory bracket 42 on the upper column.

The memory bracket 42 now has a new pivotal position with respect to the upper column such that memory bracket 42 will, with its memory striker 40, disengage memory hook 20 from projection 10 of tooth hook 8 when the upper column is the next time brought back again to the new desired tilt position, whereafter tooth hook 8 returns under the influence of the spring to its engaged position on tooth segment 6 again to lock the locking mechanism in the adjusted tilt position. Also, the position of memory tilt stop 41 has changed correspondingly so that memory tilt stop 41 abuts against memory tilt stop surface 22 when the upper column reaches the newly adjusted tilt position to stop pivoting of the upper column.

With the locking mechanism described the steering column assembly of this embodiment can be locked in a step-in/step-out position as well as in an adjustable desired tilt position, wherein the locking mechanism and its memory function are realized with simple and reliably operating mechanical components.

The invention claimed is:

1. A steering column for a vehicle comprising a lower column, an upper column connected to the lower column by a pivot connection allowing to adjust a tilt angle of the upper column with respect to the lower column, a locking mechanism including a tooth segment fixed with respect to one of the lower and upper columns, a tooth hook pivotably mounted with respect to the other one of the lower and upper columns and the tooth hook biased to an engaged position, the tooth hook meshing with the tooth segment to lock the upper and lower columns in an adjusted tilt position, and an actuator for pivoting the tooth hook out of engagement with the tooth segment to a disengaged position, the steering column further comprising:

a memory hook connected to the other one of the lower and upper columns and the memory hook adapted to cooperate with the tooth hook so that the tooth hook gets engaged by the memory hook when the tooth hook is moved to the disengaged position to keep the tooth hook in the disengaged position, a first striker fixed to the one of the lower and upper column and arranged such that the first striker acts on the memory hook when the upper column reaches a tilted step-in/step-out position, and the memory hook moves out of engagement with the tooth hook so that the tooth hook is biased back to the engaged position with the tooth hook in engagement with the tooth segment, and an adjustable memory striker pivotably mounted on the one of the lower and upper column and lockable in a desired pivot position such that the adjustable memory striker acts on the memory hook when the upper column reaches an adjusted tilt position, and the memory hook moves out of engagement with the tooth hook so that the tooth hook is biased back to the engaged position with the tooth hook in engagement with the tooth segment.

2. The steering column according to claim 1, further comprising:

a tilt stop and a cooperating tilt stop surface to prevent tilting movement of the upper column beyond the step-in/step-out position, and a memory tilt stop connected to the memory striker and a cooperating memory tilt stop surface to block further tilt movement of the upper column when the upper column has reached the adjusted tilt position.

3. The steering column according to claim 1, wherein the tooth hook is pivotably connected to the lower column, and wherein the first striker and the tooth segment are fixed to the upper column, and the adjustable memory striker is pivotably mounted to the upper column.

4. The steering column according to claim 3, further comprising an adjustment lever moveable from a first position in which the adjustment lever locks the adjustable memory striker with respect to the upper column to a second position in which the adjustable memory striker is pivotable with respect to the upper column to allow adjustment to a new adjusted tilt position of the upper column.

5. The steering column according to claim 1, wherein the memory hook is biased to move to a rest position and the memory hook is arranged to cooperate with the tooth hook such that the memory hook is free to move to a rest position when the tooth hook reaches the disengaged position, and the movement of the memory hook to the rest position causes an interlocking engagement with the tooth hook that keeps the tooth hook in the disengaged position.

6. The steering column according to claim 5, wherein the memory hook is an elongated element with an upright end which is elastically flexible to be bent in a lateral direction to bias the memory hook to the rest position.

7. The steering column according to claim 5, wherein the memory hook extends from the lower column towards the upper column and the memory hook is elastically flexible to that a free end of the memory hook can be flexed out of the rest position in two opposite directions.

8. The steering column according to claim 7, wherein the memory hook comprises a recess portion below a hook element, the recess portion being arranged to receive a tip portion of the tooth hook which is opposite to a pivotal connection of the tooth hook, wherein the recess portion is arranged and dimensioned such the tip portion of the memory hook is movable along the recess portion when the tooth hook is pivoted out of engagement with the tooth segment, and the tooth hook comprises a projection pointing towards the hook element of the memory hook and arranged to be in a region of the hook element when the memory hook is in the rest position and the tooth hook is in the disengaged position pivoted away from the tooth segment to enable the projection to come into abutment with the hook element to keep the tooth hook in the disengaged position.

9. The steering column according to claim 8, wherein the first striker and the adjustable memory striker are arranged to act on the memory hook to flex the memory hook out of the rest position so that the hook element of the memory hook moves out of the region of the projection on the tooth hook so that the tooth hook is returnable by bias force to the engaged position on the tooth segment without interference of the projection of the tooth hook with the hook element of the memory hook.

* * * * *

UNITED STATES PATENT AND TRADEMARK OFFICE
CERTIFICATE OF CORRECTION

PATENT NO. : 10,618,543 B2
APPLICATION NO. : 15/736908
DATED : April 14, 2020
INVENTOR(S) : Mattias Johansson Page 1 of 1

It is certified that error appears in the above-identified patent and that said Letters Patent is hereby corrected as shown below:

In the Claims

Column 10, Line 1-2 (in Claim 7): please replace "flexible to that a free" with --flexible so that a free--

Column 10, Line 9 (in Claim 8): please replace "such the tip potion of the" with --such that the tip potion of the--

Signed and Sealed this
Tenth Day of November, 2020

Andrei Iancu
*Director of the United States Patent and Trademark Office*